United States Patent Office 3,313,106
Patented Apr. 11, 1967

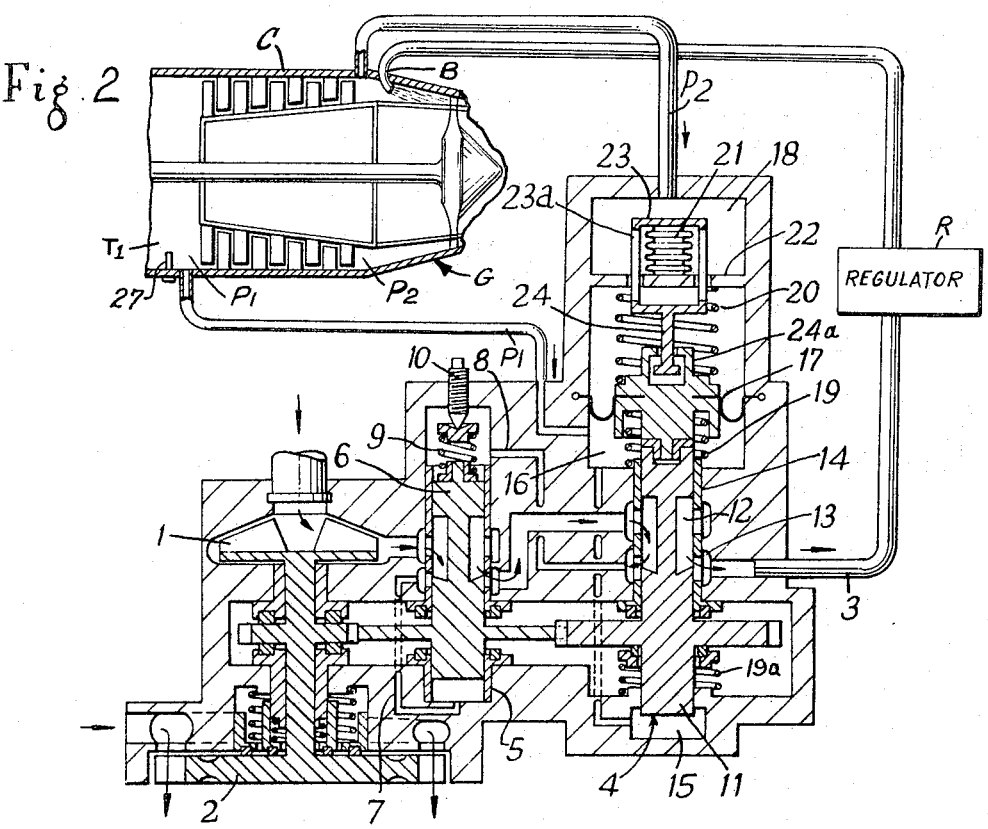
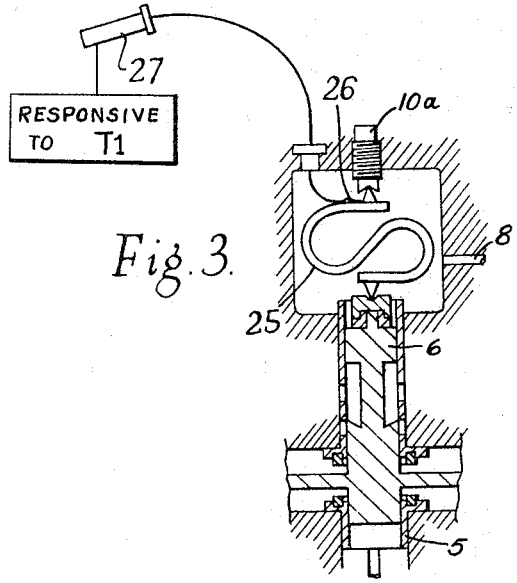

3,313,106
CONTROL OF THE FUEL SUPPLY TO A GAS TURBINE
Robert Barry Matthews, Eastleigh, England, assignor to The Plessey Company Limited, Ilford, England, a British company
Filed June 14, 1965, Ser. No. 463,791
Claims priority, application Great Britain, June 26, 1964, 26,624/64
3 Claims. (Cl. 60—39.28)

This invention relates to liquid-fuel supply systems for gas turbines and has for an object to provide an improved fuel-supply system having means which automatically limit the fuel supply during the acceleration period to avoid conditions such as compressor surge and overheating, and it is an improvement in or modification of the invention described in our co-pending U.S.A. application No. 367,928, now Patent No. 3,295,314. According to the said co-pending application, the delivery of an engine-driven fixed-displacement fuel pump is distributed between the engine and a return line by a distributor slide valve the position of which is controlled by a bellows acted-upon, against spring pressure, by the absolute pressure at the air intake of a combustion-air compressor driven by the engine while a second bellows, acted upon, against a spring load, by the difference between compressor-delivery pressure and air-intake pressure, is arranged, when the ratio of delivery pressure to intake pressure exceeds a predetermined value, to strike an abutment movable with the distribution valve so that at pressure ratios exceeding this value the further displacement of the distributor valve is proportional to the compressor-delivery pressure. Since the said system acts by distributing the whole of the delivery of an engine-driven fixed-displacement fuel pump, it is dependent on the availability of a drive proportional to engine speed; the present invention has for an object to provide an improved system which is independent of such a drive. According to the present invention fuel is supplied to the combustion chamber of a gas turbine from a pressure source, which may be the output of a centrifugal pump or may be constituted by a fixed-displacement pump in conjunction with a pressure-relief valve or with a pressure accumulator charged continuously or periodically by any suitable means, and provided with means rendering the pump inoperative when the pressure in the accumulator reaches a certain value and thereafter until the pressure drops to a second lower value, and fuel from such source is fed to a control throttle via an automatic pressure-drop adjustment valve which maintains the pressure drop across the control throttle either substantially constant or variable in accordance with a predetermined datum, for example, with the absolute temperature $T_1$ at the air intake of a dynamic compressor driven by the gas turbine to supply combustion air to its combustion chamber, the control valve being operated by compressor delivery pressure $P_2$ in such a direction as to increase its aperture with increase in the excess of the said delivery pressure $P_2$ over the compressor intake pressure $P_1$, while a second element, subject to compressor-delivery absolute pressure $P_2$, acts in the direction tending to reduce this aperture and is lost-motion coupled with the valve element to eliminate or reduce the influence of the compressor intake pressure $P_1$ when the ratio of the absolute pressure $P_2/P_1$ exceeds a predetermined value. This modification of the system of the above-mentioned copending application is based on the fact that the quotient of the shaft speed divided by the square root of the compressor air-intake absolute temperature is a unique function of the compression ratio $P_2/P_1$ of the engine-driven compressor, and that threrefore, in determining the required fuel-supply rate limitation, the utilisation of an engine-speed signal is not required, provided that the compressor-intake and delivery pressures and the compressor-intake temperature are available.

In the accompanying drawing:

FIGURE 2 is a somewhat diagrammatic sectional elevation of a control system according to the present invention which maintains the pressure drop across the fuel metering throttle valve at an adjustable constant value, and FIGURE 3 shows a modified form of the pressure-drop control valve, in which the pressure drop is automatically controlled as a function of the air-intake temperature $T_1$.

Figure 1:
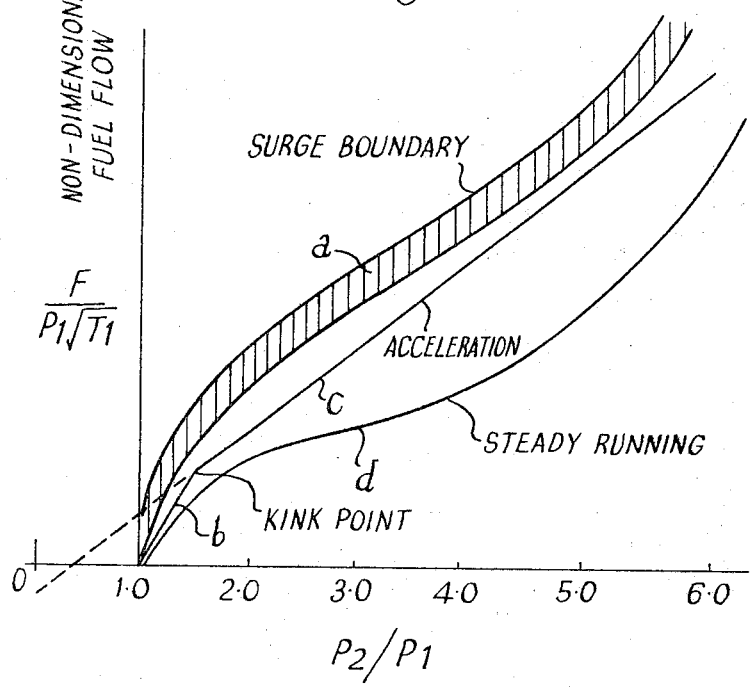
FIGURE 1 is a diagram showing the steady-running line, the surge boundary, and the line of fuel as supplied to provide acceleration by a unit according to the present invention, each plotted as a function of $P_2/P_1$.

Referring now first to FIGURE 2, a gas turbine to which the fuel is to be supplied, is diagrammatically shown at G and has a combustion chamber B equipped with a fuel-burner unit. Its combustion air is supplied by a dynamic compressor C, which is driven by the gas turbine G, and which raises the pressure of the combustion air from an air-intake pressure $P_1$ to a compressor-delivery pressure $P_2$. The illustrated embodiment of the fuel system according to the invention employs a centrifugal fuel pump 1 which is driven by an air turbine 2 having no mechanical connection with the gas turbine G. A line 3 delivering the metered fuel, if desired via other controls R, to the gas turbine engine burners in combustion chamber B, is connected to the delivery of the centrifugal pump 1 via metering ports of two series-connected valves, namely of a fuel-metering throttle valve 4 and of a pressure-drop control throttle valve 5. The latter serves to maintain the pressure drop across the metering valve 4 at a desired value which in this embodiment is substantially constant, being determined by the opposed action of the fuel pressures upstream and downstream of the metering valve 4 upon two opposed surfaces of the piston-type valve element 6 of the pressure-drop control valve 5. These pressures are respectively admitted to the surfaces in question by two passages 7 and 8, and the action of their difference is opposed by a spring 9 which is adjustable by a screw 10. The valve element of the metering valve 4 is constituted by a stem 11 having a port which is constituted by a circumferential groove 12 and co-operates with a control port 13 in a stationary sleeve 14. The stem 11 is acted-upon for axial displacement by the compressor-intake pressure $P_1$ which is admitted to two chambers 15 and 16, respectively, facing the stem 11 and a diaphragm 17. This diaphragm separates the chamber 16 from a further chamber 18 to which compressor-delivery pressure $P_2$ is admitted. The action of pressure $P_2$ upon the diaphragm 17 opposes the above-mentioned action of pressure $P_1$ and urges the valve element 11 in the direction increasing the exposed area of the control port 13 against a spring 19, which is itself assisted by a second spring 19a and opposed by a further spring 20. It will be readily appreciated that, since the total of the effective areas assisting the spring 19 in chambers 15 and 16 is equal to the effective area on which the pressure $P_2$ in chamber 18 acts to oppose the action of spring 19, the stem 11 will be moved in the direction increasing the opening of port 13 by an amount proportional to the pressure difference $P_2-P_1$ and inversely proportional to the combined rate of the springs 19, 19a and 20.

Arranged in the chamber 18 coaxially with the stem 11 is an element 21 combining the functions of a thrust spring and an evacuated bellows of a cross-sectional equal to the cross-section of valve stem 11 on which pressure $P_1$ acts in the chamber 15. One end of this spring bellows is supported on a fixed perforated partition 22 extending across the chamber 18, and the bellows extends from the partition 22 in the direction away from the stem 11; at its other end the spring bellows 21 carries an end plate 23 with which a yoke 24 is connected by rods 23a extending through the partition 22. The yoke 24 is connected with the stem 11 by a lost-motion coupling 24a. In the element 21 the circumferential wall of the bellows acts as a spring, which is so dimensioned that, within the range of the lost motion provided by the coupling 24a, an increase in the absolute value of compressor-delivery pressure $P_2$ will displace the end plate 23 by an amount which, at any practical value of the pressure $P_1$, is smaller than that by which the stem 11 is displaced by the increase of $P_2-P_1$. When $P_2/P_1$ reaches a predetermined value, the lost motion is therefore taken up, and as a result, any further movement of the stem 11 will require, due to the combined effect of the spring 19 and the resilience of the spring bellows 21, a greater increase per unit of movement in the excess of pressure $P_2$ in chamber 18 over the pressure $P_1$ in chamber 16 than at lower ratios of $P_2/P_1$. The two conditions, before and after the lost motion is taken up, are respectively represented by lines $b$ and $c$ of the diagram of FIGURE 1.

Referring now to FIGURE 1, it will be noticed that the device of the present invention approximates the surge-boundary region $a$ by an acceleration fuel supply line constituted by two rectilinear portions $b$ and $c$, the former starting with a zero fuel supply at $$\frac{P_2}{P_1}=1$$

and extending to the point of its intersection with the second rectilinear portion $c$ of lower gradient, which would intersect the zero-delivery line at a value of $P_2/P_1$ which, though smaller than 1, is always positive. The figure shows clearly that, while a line of this gradient, if passing through zero at $$\frac{P_2}{P_1}=1$$

would be unusable as lying on the greater part of its length below the steady-running line $d$, and while line $b$, if continued beyond the said point of intersection, would enter the surge boundary $a$ at a low compression ratio, the composite line constituted by adjoining parts of each of the two lines, which is provided by the present invention, provides an acceleration line which lies throughout a large range of compression ratios well above the steady running line $d$ while being safely clear of the surge boundary $a$.

It can be shown by mathematical considerations that if the pressure drop across the throttle valve 4 is controlled to vary in proportion with the air-intake temperature $T_1$, the volumetric flow F multiplied by the square root of the fluid density $\rho$ and divided by the product of the intake pressure $P_1$ and the square root of the intake temperature $T_1$, i.e., the value $$\frac{F\sqrt{\rho}}{P_1\sqrt{T_1}}$$

will, within the lost-motion range of coupling 24a, be proportional to $$\frac{P_2}{P_1}-1$$

thus generating a straight line passing through zero at $$\frac{P_2}{P_1}=1$$

while when the yoke 24 and stem 11 move jointly, a shallower line will result which intersects the $$\frac{F\sqrt{\rho}}{P_1\sqrt{T_1}}$$

line at a point at which $$\frac{P_2}{P_1}=\frac{A_1}{A_1+A_2}$$

$A_1$ being the diaphragm area operative before the two elements touch and $A_2$ being the cross-sectional area of the evacuated bellows.

In the apparatus as illustrated in FIGURE 2 it will be the value of $F/P_1$ whose gradient changes between those of lines $b$ and $c$, at a predetermined value of $P_2/P_1$, because the spring 9 maintains the pressure drop in port 13 constant; such an arrangement will often be found acceptable in cases in which the temperature range of operations is relatively narrow. In cases in which this approximation is not permissible, the bimetal spring 25 of FIGURE 3 may be substituted for the spring 9 of FIGURE 2 and arranged to vary its rate according to the absolute air intake temperature $T_1$. This may be effected by arranging in the chamber containing spring 25 a heating element 26 which is controlled by a $T_1$ probe 27 in such a manner as to vary the temperature of the liquid in this chamber in accordance with the temperature $T_1$ of the probe.

Mathematical consideration shows that the flow value which the device described controls in accordance with line $bc$ of FIGURE 1 is not the actual mass flow $\rho F$ but a value $F\sqrt{\rho}$. This approximation will be generally found permissible in view of the relatively small amount by which the fuel density $\rho$ is normally liable to vary.

What is claimed is:

1. In a liquid-fuel supply system for a gas turbine having a combustion chamber and a dynamic compressor driven by the turbine to supply combustion air to said chamber, and wherein the system includes a source of fuel under pressure, a control throttle forming a variable aperture through which fuel passes from said source to the combustion chamber, an automatic pressure-drop adjustment valve associated with said control throttle to maintain the fuel-pressure drop produced by said aperture at a predetermined function of an operation datum of the gas turbine and compressor combination, and actuating means for said control throttle, operated by the intake and delivery pressures $P_1$ and $P_2$ of said compressor to increase the size of said aperture in accordance with the force exerted by the pressure difference $P_2-P_1$ acting upon a predetermined area against spring means: the combination, with said actuating means (17), of a supplementary actuating means (24) for said control throttle (4) operated by the compressor-intake pressure $P_1$, acting upon a second area in the same direction in which the pressure difference $P_2-P_1$ acts upon said first-mentioned means, against a resilient element (21), and connected to said actuating means (17) by a lost-motion coupling (24a), said second area and said resilient element (21) being so related to said predetermined area and said spring means (19) as to cause the lost motion of said coupling (24a) to be taken up when the value $P_2/P_1$ increases from unity to a predetermined higher value.

2. A liquid-fuel supply system as claimed in claim 1, wherein the automatic pressure-drop adjustment valve is arranged to control a variable orifice passed by the fuel flow in series with said variable aperture and means for controlling the size of said variable orifice, which means include a movable abutment (6) acted-upon by the pressure upstream of said variable aperture against the action of an adjustable spring means (9, 25) which is supported by the pressure downstream of the said variable aperture.

3. A liquid-fuel supply system as claimed in claim 2, further comprising means responsive to the temperature at the intake of said compressor and operative to automatically vary the tension of said spring (25) in accordance with said temperature.

References Cited by the Examiner
UNITED STATES PATENTS

| | | | |
|---|---|---|---|
| 2,720,751 | 10/1955 | Kunz | 60—39.28 |
| 2,846,846 | 8/1958 | Mock | 60—39.28 |
| 2,971,336 | 2/1961 | Mock | 60—39.28 |
| 3,230,709 | 1/1966 | Turner | 60—39.28 |

JULIUS E. WEST, *Primary Examiner.*